(12) United States Patent
Sherman et al.

(10) Patent No.: US 11,496,001 B2
(45) Date of Patent: Nov. 8, 2022

(54) DETECTION OF FOREIGN OBJECT AND FRIENDLY METAL

(71) Applicant: POWERMAT TECHNOLOGIES LTD., Petach Tikva (IL)

(72) Inventors: Itay Sherman, Hod-Hasharon (IL); Elieser Mach, Rosh Tzurim (IL); Guy Raveh, Mevo Beitar (IL)

(73) Assignee: POWERMAT TECHNOLOGIES LTD., Petah Tikva (IL)

( * ) Notice: Subject to any disclaimer, the term of this patent is extended or adjusted under 35 U.S.C. 154(b) by 0 days.

(21) Appl. No.: 17/467,329

(22) Filed: Sep. 6, 2021

(65) Prior Publication Data

US 2022/0077719 A1   Mar. 10, 2022

Related U.S. Application Data

(60) Provisional application No. 63/075,318, filed on Sep. 8, 2020.

(51) Int. Cl.
| | |
|---|---|
| *H02J 50/60* | (2016.01) |
| *H02J 50/80* | (2016.01) |
| *H02J 50/90* | (2016.01) |
| *H02J 50/12* | (2016.01) |
| *H04B 5/00* | (2006.01) |

(52) U.S. Cl.
CPC .............. *H02J 50/60* (2016.02); *H02J 50/12* (2016.02); *H02J 50/80* (2016.02); *H02J 50/90* (2016.02); *H04B 5/0037* (2013.01)

(58) Field of Classification Search
None
See application file for complete search history.

(56) References Cited

U.S. PATENT DOCUMENTS

2019/0334388 A1* 10/2019 Van Wageningen .... H02J 50/60

FOREIGN PATENT DOCUMENTS

| EP | 2770602 A1 | 8/2014 |
|---|---|---|
| WO | 2014/048161 A1 | 4/2014 |
| WO | 2019/165383 A1 | 8/2019 |
| WO | 2020/003314 A1 | 1/2020 |

OTHER PUBLICATIONS

Extended European Search Report dated Jan. 25, 2022 for European Patent Application No. 21195325.2.

* cited by examiner

*Primary Examiner* — Adi Amrany
(74) *Attorney, Agent, or Firm* — Volpe Koenig

(57) ABSTRACT

A power transmitter may send a digital ping to a receiver. The power transmitter may transfer power to the receiver. The power transmitter may receive a report from the receiver which may comprise a received power value. The power transmitter may determine a transmitted power parameter value, which may be based on a threshold value subtracted from a transmitter power and based on transmitter losses subtracted from the transmitter power. The power transmitter may determine that the received power value is less than the determined transmitted power parameter value and may send an analog ping to the receiver in response to a determination that the received power value is less than the determined transmitted power parameter value. The power transmitter may measure a decay pattern of the analog ping. The power transmitter may determine that the receiver comprises a friendly foreign object. The power transmitter may update the threshold value.

18 Claims, 5 Drawing Sheets

11,496,001 B2

DETECTION OF FOREIGN OBJECT AND FRIENDLY METAL

CROSS REFERENCE TO RELATED APPLICATION

This application claims the benefit of U.S. Provisional Application No. 63/075,318, filed Sep. 8, 2020, which is incorporated by reference as if fully set forth.

FIELD OF INVENTION

The disclosure relates generally to wireless power transfer systems, and more specifically, to methods for detecting foreign objects and friendly metal by a wireless power transmitter.

BACKGROUND

Wireless power transfer systems, and in particular inductive wireless power systems, transfer power from a transmitting coil in a transmitter to a receiving coil in a receiver. The power is transferred via an alternating magnetic field induced by the transmitting coil.

In an ideal system, all the energy emitted by the transmitter in the form of a magnetic field is captured by the receiving coil and no energy is lost to other objects. However, in real life scenarios, the magnetic field created by the transmitting coil may also interact with other objects in addition to the receiving coil. These other objects may be referred to as 'foreign objects'. The foreign objects may be common everyday objects such as metal coins, paper clips, metallic foils, or any other ferromagnetic material. The foreign objects may be magnetically active components that are part of a device either of a transmitter (e.g., PCB etc.) or of a receiver (e.g., PCB, battery, etc.). Foreign objects in the presence of a magnetic field may overheat and may cause fire or burns.

Standard inductive power systems (e.g., power systems based on the Wireless Power consortium (WPC) Qi standard or other standards) may use methods to detect the presence of a foreign object and limit charging in a case that a foreign object is detected.

A common method for detecting the presence of a foreign object is to use a closed loop reporting. In closed loop reporting the receiver informs the transmitter regarding the amount of power the receiver actually receives. The receiver may also take into account its internal losses on its electric and magnetic circuits. The transmitter calculates its own power consumption and losses. A substantial gap between the receiver's received power and the transmitter's transmitted power may indicate a presence of a foreign object that interacts with the magnetic field. In this case, the transmitter may cease operation.

In a version of the Qi standard, a method of using a Q factor calculation may be used. The Q factor represents a ratio between stored energy in the resonance circuit to energy wasted on a cycle. The Q factor may be reported by a receiver to a transmitter. The transmitter knows its own Q factor and may then sense the system over all Q factors from which it can derive the Q factor attributed to the receiver. If the derived value is lower than the one reported by the receiver, a foreign object is most likely interacting with the magnetic field.

For a receiver embedded in a larger host device, such as a mobile handset, the body of the host device itself may act as a foreign object. In such a case, the foreign object may be referred to as a 'friendly foreign object' (FFO) or 'friendly metal', since it is inherently part of the receiver.

In current standards, the receiver is allowed to report a lower Q factor that takes into account the effects of a friendly foreign object and may report additional estimated receiver losses estimating the loss on the friendly foreign object.

However, these methods do not take into account the variance in the amount of energy absorbed by a friendly foreign object. This variance may be extremely large depending on the exact placement of the receiver coil on the transmitter coil. Larger lateral offsets may cause stronger interaction of the magnetic field with the friendly foreign object while larger vertical gaps may decrease it. In addition, the exact absorbed energy may also be dependent on the oscillation frequency of the magnetic field.

The above described phenomena is a limiting factor for the operational range of many inductive power systems. A phone placed on a charging area (e.g., a charging pad) with a large offset (for example >12 mm) may likely have a strong interaction between the friendly foreign object and the transmitter field. For example, in a system operating at 10 W output power, a friendly foreign object may be absorbing >1 W of power during operation when it is placed with a large offset of 12 mm. The same handset placed at full alignment may only have ~200 mW of power absorbed by the friendly foreign object.

Existing foreign object detection methods may limit the range since foreign object detection may be activated for large offsets, or it may work with large detection thresholds that may not allow proper detection of a real foreign object when a phone is aligned.

Thus, there is a need for improved foreign object and friendly metal detection.

SUMMARY

According to an embodiment, a power transmitter is provided. The power transmitter may send a digital ping to a receiver. The power transmitter may transfer power to the receiver. The power transmitter may receive a report from the receiver. The report may comprise a received power value. The power transmitter may determine a transmitted power parameter value. The transmitted power parameter value may be based on a threshold value subtracted from a transmitter power. The transmitted power parameter value may be based on transmitter losses subtracted from the transmitter power. The power transmitter may determine that the received power value is less than the determined transmitted power parameter value. The power transmitter may send an analog ping to the receiver in response to a determination that the received power value is less than the determined transmitted power parameter value. The power transmitter may measure a decay pattern of the analog ping. The power transmitter may determine that the receiver comprises a friendly foreign object. The power transmitter may update the threshold value.

The power transmitter may measure a decay rate value of the analog ping and measure an oscillation time value of the analog ping. The power transmitter may update a preconfigured decay rate value and update a preconfigured oscillation time value.

The power transmitter may determine that a measured decay rate value is less than or equal to the preconfigured decay rate value by a threshold amount. The power transmitter may replace the preconfigured decay rate value with the measured decay rate value.

The power transmitter may determine that a measured oscillation time value is less than or equal to the preconfigured oscillation time value by a threshold amount. The power transmitter may replace the preconfigured oscillation time value with the measured oscillation time value.

The power transmitter may determine that a measured oscillation time value is greater than a stored oscillation time value. The power transmitter may determine that a measured decay rate value is less than or equal to a decay rate threshold.

The power transmitter may send a second digital ping to the receiver. The power transmitter may transfer power to the receiver. The power transmitter may receive a second report from the receiver. The second report may comprise a received power value. The power transmitter may determine a second transmitted power parameter value. The second transmitted power parameter value may be based on the updated threshold value subtracted from a transmitter power. The power transmitter may determine that the received power value is less than the determined second transmitted power parameter value. The power transmitter may send a second analog ping to the receiver in response to a determination that the received power value is less than the determined second transmitted power parameter value. The power transmitter may measure a decay pattern of the second analog ping. The power transmitter may determine that the receiver comprised a friendly foreign object. The power transmitter may update the updated threshold value.

The power transmitter may determine that there is a receiver in a charging area before sending the digital ping. The determination that there is a receiver in a charging area may be based on a measured decay rate value and a measured oscillation time value.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter is particularly pointed out and distinctly claimed in the claims at the conclusion of the specification. The forgoing and other features, and advantages of the embodiments herein are apparent from the following detailed description taken in conjunction with the accompanying drawings in which:

DETAILED DESCRIPTION

The methods described herein may be an expansion of methods described in a previous submission PCT/IL2019/050711.

Embodiments disclosed herein may include apparatuses, systems, methods, and/or computer program products (generally discussed herein as a system) that provide for a power transmitter (Tx) transfer power to a power receiver (Rx).

The term "device" or "host device" may refer to a device such as a smartphone, a phone, a tablet, a laptop computer, or the like that can be charged by a wireless power system of the present disclosure. The term "friendly foreign object" or "friendly metal" may refer to components that are an integral part of the construction of the device, in which the receiver is embedded to. The friendly metal may have ferromagnetic properties that interact with the magnetic field and consume part of this energy.

Figure 1:
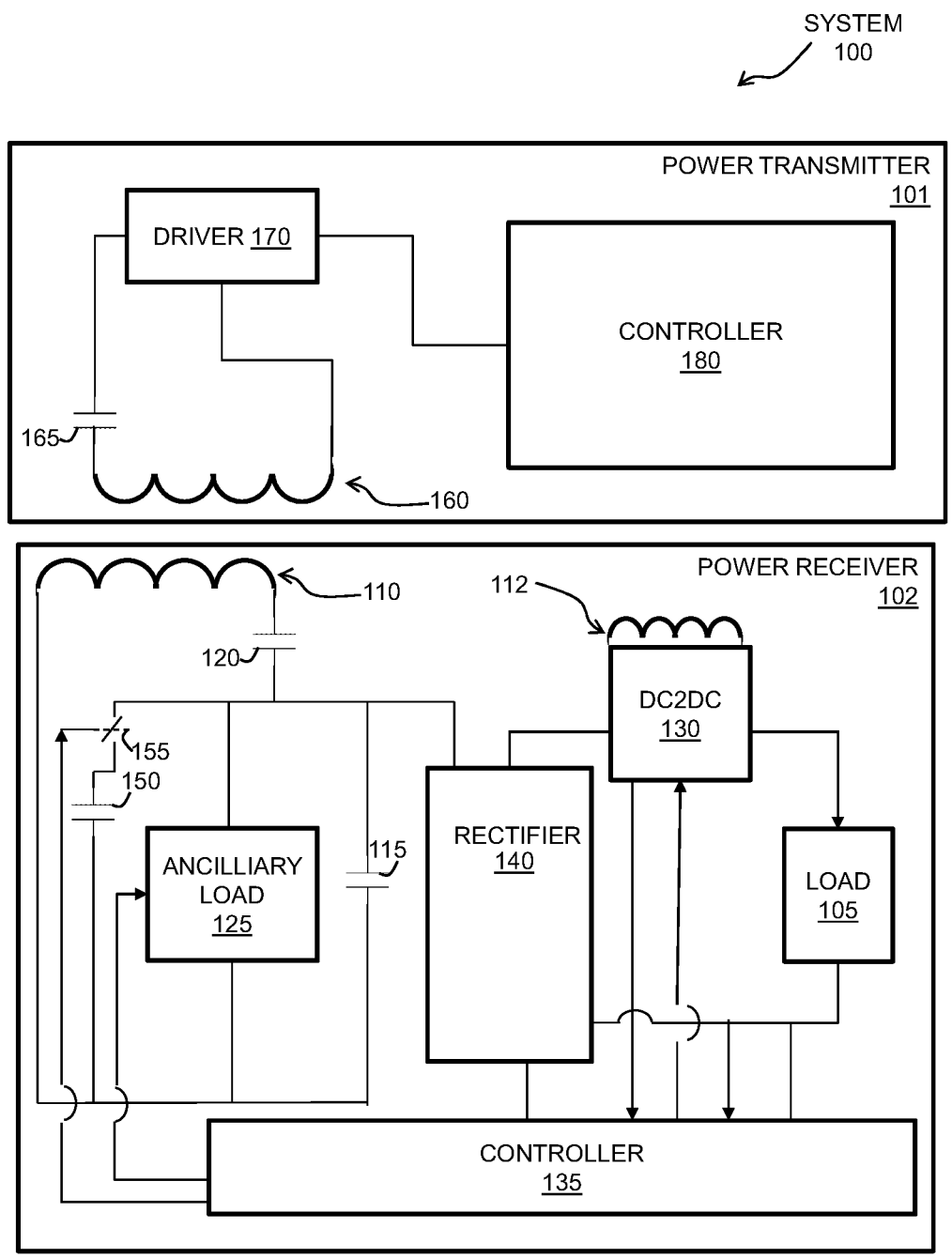
FIG. 1 depicts a block diagram depicting a power receiver and a power transmitter of a system in accordance with one or more embodiments.

FIG. 1 shows a block diagram depicting a system 100 for wireless power charging in accordance with one or more embodiments. The system comprises a power transmitter (Tx) 101 and a power receiver 102 (Rx). The Tx 101 is any device that may generate electromagnetic energy to a space around the Tx 101 that is used to provide power to the Rx 102. The Rx 102 is any device that may receive, use, and/or store the electromagnetic energy when present in the space around the Tx 101.

As shown in FIG. 1, the Tx 101 includes circuitry for generating and transmitting the electromagnetic energy (e.g., transmitting power). The circuitry of the Tx 101 may include a transmitting coil 160; a resonance capacitor 165; a driver 170; and a controller 180. The coil 160 and the capacitor 165 provide a resonance circuit for generating an inductive current in accordance with operations of the driver 170 and the controller 180 to support power transmissions. The controller 180 may transmit and/or receive information and instructions between the controller 180 and elements of the Tx 101. The transmitter controller 180 may monitor the current or the voltage of the transmitter resonance circuit.

According to one or more embodiments, the controller 180 may sense one or more currents or voltages, such as a DC input voltage (Vin) and a DC output voltage (Vout). According to one or more embodiments, the controller 180 may activate one or more switches to change the resonance frequency.

As shown in FIG. 1, the Rx 102 includes circuitry for receiving and storing electromagnetic energy, such as a load 105. The circuitry of the Rx 102 may also include a resonance coil 110; a parallel resonance capacitor (capacitor) 115; a serial resonance capacitor (capacitor) 120; an ancillary load 125; a direct current to direct current converter (DC2DC) 130; a controller 135; and a rectifier 140. In accordance with some example embodiments, the Rx 102 may be used to wirelessly obtain induced power from the Tx 101 for supplying power to a load 105. For example, the Rx 102 may be used for charging the load 105, examples of which include handheld battery, a power supply, a combination thereof, and the like. Additionally, the Rx 102 may be capable of wireless communication with the Tx 101 (e.g., in-band communication). According to one or more embodiments, a resonate section (circuit) of the Rx 102 may include the coil 110 covered with ferrite, the capacitor 120, and the capacitor 115, a power-supply section of the Rx 102 may include the rectifier 140 and the DC2DC 130, and a control and communication section of the Rx 102 may include the controller 135 and the ancillary load 125.

The values of the resonance circuit components are defined to match with a transmitted frequency of the Tx 101. The Rx 102 may be provided with or without the capacitor 115. Additionally, or alternatively, the resonance circuit may further comprise at least one branch each having a tuning capacitor (rcap) 150 and a switch 155 controlled by the controller 135.

The rectifier 140 of the power supply section may be utilized for converting AC voltage attained by the resonance circuit to DC voltage. The rectifier 140 may be based on commercially available half-wave rectification; full-wave rectification; controlled (e.g., field-effect transistor -based of FET based) full-wave rectification; and any combination thereof, or the like. According to one or more embodiments, the rectifier 140 may be any rectifier using one or more components, such as 4 diodes (e.g., asynchronous rectifier), 2 didoes and 2 FETs (half synchronous), 4 FET (synchronous), or 2 capacitors and 2 switches, that are controlled by either a dedicated logic circuit or the controller 135.

According to one or more embodiments, the DC2DC 130, of the power supply section, may be utilized for adjusting output voltage and/or current, attained from the rectifier 140, to the load 105. According to one or more embodiments, the DC2DC 130 may be a DC-to-DC converter capable of stepping up its output voltage magnitude, above its input voltage, and/or stepping down its output voltage to almost zero. To do so the DC2DC utilizes inductor 112 used for both the stepdown mode and step-up mode. The DC2DC 130 may be based on the principles of a switched mode power supply having its output voltage vary, across a relatively large range. The output voltage of the DC2DC 130 may be regulated by varying frequency and duty-cycle of the DC2DC 130 switching, such as a switch mode power-supply, with a switching signal generated at controller 135.

According to one or more embodiments, the controller 135 may be a computerized component or a plurality of computerized components. The controller 135 may include a central processing unit (CPU) based on a microprocessor, an electronic circuit, an integrated circuit, implemented as special firmware ported to a specific device such as a digital signal processor, an application specific integrated circuit, and any combination thereof, or the like. The controller 135 may include a computer program product that stores a computer readable storage medium. According to one or more embodiments, the controller 135 may be utilized to perform computations required by the Rx 102 or any of the circuitry therein.

The controller 135 may also comprise an input/output (I/O) module utilized as an interface to transmit and/or receive information and instructions between the controller 135 and elements of the Rx 102, such as ancillary load 125; DC2DC 130; rectifier 140; at least one switch 155. According to one or more embodiments, the controller 135 may activate, through the I/O module, the ancillary load 125 with a signal that incapsulates information encoded by controller 135. The ancillary load 125 may be connected before or after rectifier 140. The signal may be configured to excite the ancillary load 125 in a way that impacts the coupling between the Rx 102 and the Tx 101, so a detection circuit of the Tx 101 may decode the information. Note that the controllers 135 and 180 may be similarly configured.

According to one or more embodiments, the controller 135 may sense, through the I/O module, the DC input voltage (Vin) and DC output voltage (Vout) of the DC2DC 130. The controller 135 may also sense a current (i) flowing from the DC2DC 130 to the load 105. Additionally, or alternatively, the controller may regulate the output voltage of the DC2DC 130 with a switching signal. According to one or more embodiments, the controller 135 may activate, through the I/O module, one or more switches of the at least one switch 155 to change the resonance frequency. By activating, with the at least one switch 155, the at least one capacitor (e.g., such as map 150) may be added in parallel to the resonance circuit, thus adding the equivalent capacitance of the at least one capacitor, which subsequently alters the resonance frequency.

According to one or more embodiments, controller 135 may cause the Rx 102 to participate in in-band communications with the Tx 101. In this regard, the controller 135 may determine/detect/sense one or more signals (e.g., values, losses, impulse responses, data, and other parameters). Note that additional location are contemplated by the system 100, such as the controller 135 may determine/detect/sense one or more signals with respect to a shunt resistor of the Rx 102. Accordingly, the controller 135 may utilize the one or more signals to receive in-band communication from the Tx 101, to perform digital signal processing on the in-band communication, and to the instruct the circuitry therein to respond to the Tx 101.

The driver 170 of the TX 101 may emit a single pulse or multiple pulses in the form of analog and/or digital pings. An analog ping may be initiated to load the resonance circuit with energy. The controller may sample and analyze a decay pattern. The decay pattern may be observed shortly after the completion of the transmission of the pulses (single or multiple).

A decay rate and an oscillation time of the decay pattern may be measured. The decay rate may be the rate of energy decay of the response. The decay rate may be measured as a ratio between energy of two consecutive buffers of signal samples. The oscillation time may be the time interval between two peaks of the response oscillation. The oscillation time may be measured as the time between two peaks of sampled signals or as the time between a fixed number of peaks.

Figure 2:
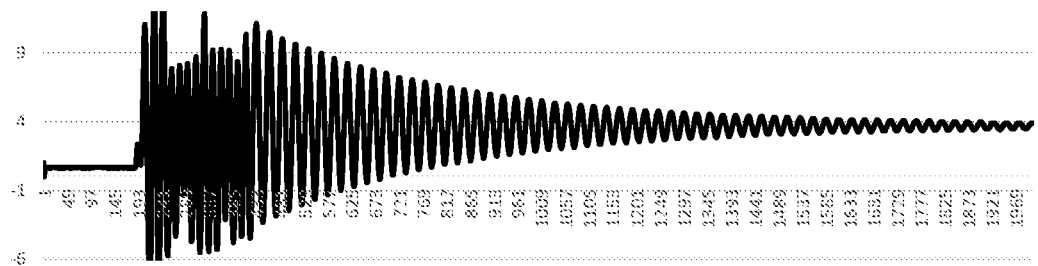
FIG. 2 depicts an excitation and response for an analog ping.

FIG. 2 shows an excitation and response for an analog ping. In FIG. 2, a sampled signal of a resonance circuit is shown. The X-axis shows the sample numbers. Sampling in this case is performed every 1.2 psec. The Y-axis shows amplitude measured in volts (V) or current in amperes (A). A typical oscillation period may be for example 4-10 µs. The excitation is activated at approximately sample 170 and continues up to approximately sample 450. From that point on, the decay of the excitation is shown. The decay pattern has a specific decay rate and oscillation time which may be measured by the transmitter.

Default values of decay rate and oscillation time for a system that has an open pad (i.e., no device on the charging area) may be pre-stored or pre-configured in the transmitter. The default values may be measured in a controlled environment, for example at the production line, and stored in the transmitter (e.g., stores in non-volatile memory).

Figure 3:
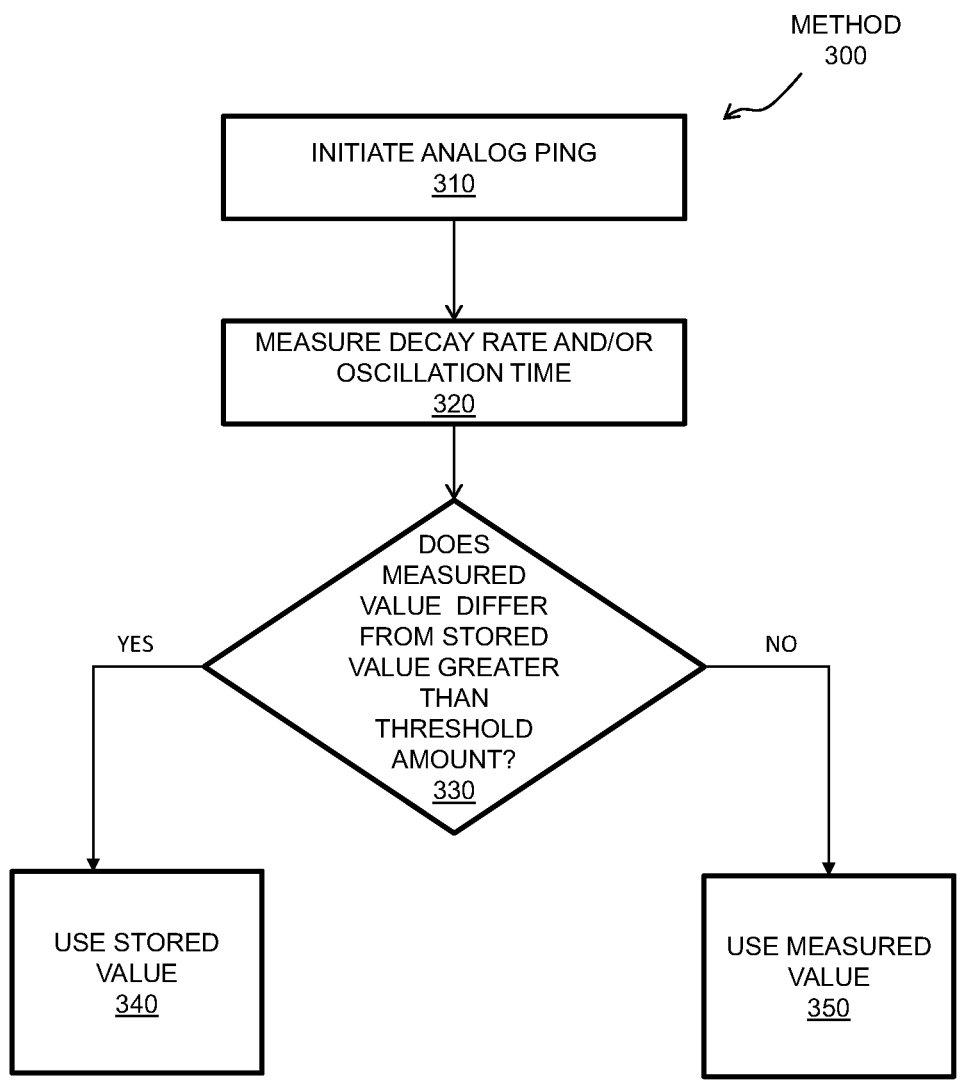
FIG. 3 depicts a method of updating decay rate and/or oscillation time values in accordance with one or more embodiments.

The default decay rate and/or oscillation times may be updated. The update may be done on a transmitter boot (e.g., when the transmitter is turned on or initialized). The update may be done for each transmitter boot. FIG. 3 shows a method 300 for updating decay rate and/or oscillation time values. An analog ping may be initiated (310). A decay rate parameter and/or an oscillation time parameter may be measured (320). A determination may be made whether a measured values differs from a stored value by a threshold amount (330). The threshold amount may be for example 5% difference between a measured value and a stored value. If a measured value differs from a stored value by an amount greater than the threshold amount (e.g., >5%), the stored value may be used as the default value (340). If a measured value differs from a stored value by no greater than the threshold amount (e.g., ⇐5%), which may indicate that there is no object on the charging area, then the measured value may be used as the default value (350). The decay rate and the oscillation time may be compared to a same threshold amount or the decay rate may be compared to one threshold amount and the oscillation time may be compared to a different threshold amount. For example, the decay rate threshold amount may be in range of 5% to 10% whereas the oscillation time threshold amount may be in a range of 2% to 5%. It may be a case where the decay rate is updated and the oscillation time is not (i.e., oscillation time keeps the default value), or the oscillation time may be updated and the decay rate is not (i.e., decay rate keeps the default value), or both the decay rate and the oscillation time may be updated.

A foreign object and/or friendly foreign object detection procedure may involve the use of an analog ping. The analog ping may be used in different situations, scenarios, or sessions.

A first situation may be an initial or starting situation (e.g., no device or receiver on a charging area), where the transmitter may determine a charging status based on a first session of an analog ping. For example, the charging status may be that the charging area (mat) is free (i.e., no device or receiver on the charging area/mat) or the status may be that there is a device or receiver on the charging area, or the status may be that a foreign object is detected.

A second situation may be after a status is determined in the first situation or after termination of charging due to a foreign object detection. The foreign object detection may be as a result of a closed loop power reporting, or any other foreign object detection method. In the second situation, the transmitter may determine whether the foreign object detected is a real foreign object or a friendly foreign object. The transmitter may determine whether the charging area (mat) is free (i.e., no device or receiver on the charging area/mat), or whether there is a device or receiver with a friendly foreign object, or whether there is a foreign object.

In an embodiment, for the initial or first situation, the status of the charging area may be determined based on a threshold condition. The threshold condition may be a combined threshold condition of both decay rate and oscillation time In an embodiment, a status of no device or receiver on the charging area (mat is free) may be determined based on the values of both decay rate and oscillation time having a small margin from the pre-stored or initial values. A pre-stored ratio may be designated as R_default and a pre-stored oscillation time may be designated as Time_default. In an embodiment, a small margin for both decay rate and oscillation time may be a 5% margin from the pre-stored or initial values. In an embodiment, a small margin may be different for the decay rate and the oscillation time. For example, the decay rate may be a 10% margin and the oscillation time may be a 3% margin.

In an embodiment, a status of a device or receiver on the charging area (i.e., an object that is likely a valid receiver is on the charging area) may be determined based on an oscillation time value and decay rate value compared to default values. In an example, the oscillation time value may be higher, equal to, or slightly lower (e.g., up to 5% margin from Time_default) than the default oscillation time value (e.g., Time≥Time_default−Tstart), where Time is the measured oscillation time, Time_default is the pre-stored or initial oscillation time and Tstart is a threshold value to allow start of engagement with the device. A decrease of the oscillation time may be due to device friendly metal, and an increase may be due to a presence of a shielding ferrite material of the device increasing inductance of transmitter coil. In an example, the decay ratio is less than or equal to a threshold (e.g., Rstart).

In an embodiment, a status of a foreign object detected may be determined. The foreign object detection may be determined based on a closed loop reporting, based on a power report difference between a receiver measurement vs. a transmitter measurement, or any other foreign object detection method.

If a foreign object is detected, a second session of an analog ping may be performed and analyzed. A goal of the second session of the analog ping is to differentiate between a real foreign object and a friendly foreign object.

In an embodiment, for the second session of the analog ping, the status of the charging area may be determined based on a threshold condition. The threshold condition may be a combined threshold condition of both decay rate and oscillation time.

In an embodiment, for the second session of the analog ping, a status of no device or receiver on the charging area (mat is free) may be determined and may be based on values of both decay rate and oscillation time may have a small margin from the pre stored or initial values for these parameters. This may occur if the receiver was removed from the charging area.

In an embodiment, for the second session of the analog ping, a status of a receiver with a friendly foreign object (i.e., a valid receiver with a high degree of friendly foreign object is present) may be determined based on decay rate and oscillation time parameters. For example, a typical condition may be that the oscillation time value is larger or equal to the default oscillation time (i.e., Time≥Time_default), and the decay rate is less than or equal to a specific threshold (Rstart) or the oscillation time is lower by no more than a threshold for foreign object detection (e.g., Tfo) and decay ratio is lower than a ratio for foreign object detection (e.g., Rfo). In an embodiment, Tfo may be 5% of Time_default, and Rfo may be 20 times the R_default, and Rstart may be 15 time R_default, The rules and thresholds for friendly foreign object detection may vary given that a condition for friendly foreign object detection may be different from the initial conditions defined for the first analog ping session with a receiver or device on the charging area status.

The second analog ping session procedure differ from the initial (first analog ping session) procedure since the system may be aware of a presence of some foreign object content, and attempts to differentiate between a friendly foreign object and an external (real) foreign object. Rules for differentiating between these two cases are therefore different than the ones used in first analog ping session where the rule is defined in a way to allow coverage of all receiver placements, and may also include scenarios were a foreign object is placed with the receiver.

In an embodiment, upon determination of a receiver with a friendly foreign object, the transmitter may attempt to re-engage with the receiver using a digital ping, but may allow for a higher gap between the receiver power report and the transmitters own power calculation to allow for the added losses on the friendly foreign object (i.e., the threshold for foreign object detection for closed loop reporting may be increased). This may allow usage of the larger allowed gap between the receiver reported power and transmitter transmitted power, but may limit to a case of a misaligned receiver device, while allowing tight foreign object detection thresholds for the case of a real foreign object (e.g., metallic object) being introduced between the transmitter and the receiver.

In an embodiment, if a condition of a foreign object detection is again reached due to for example, the power reporting, the transmitter may repeat the analog ping session to determine if the object is a friendly foreign object and may further increase the allowed gap if the transmitter determines the object to be a friendly foreign object. In an embodiment, the transmitter may terminate power transfer in this case, or allow a specific number of repetitions and gap increases sessions.

The thresholds for friendly foreign object detection may be set such that for a very large offset of a device or receiver where friendly foreign object effect is extremely high and causes power transfer to be extremely inefficient (e.g., heats up the friendly foreign object), the transmitter may detect a foreign object in these conditions and not continue to power transfer.

Determination of the thresholds rules as well as an allowed added gap for closed loop reporting may be dependent on the type or brand of device (i.e., mobile handset) detected. The detection of type or brand of device may be based on WPC/Qi identification information provided by the receiver at engagement.

In an embodiment, if the transmitter reaches an end of charge state due to foreign object detection or due to other conditions of a failed operation with a valid receiver, the transmitter may transfer to a sliding state. In a sliding state, the transmitter may wait for a user to improve the placement of the device or receiver on the charging area or mat or wait until the removal of a foreign object.

A user may remove the device entirely from the charging area or mat and then replace it, which may cause a transmitter to return to a no object on mat state, and may be followed by detection of an object and charging operation. The user may keep the device on the mat and simply remove the obstructing object or slide the phone to a better aligned position.

The transmitter is configured to detect such a change and may be able to return to a charging operation that does not require the device to be completely removed and replaced on the charging area or mat. This may increase the user experience and may be important in certain environments such as an automotive environment in which sliding the receiver device for better alignment with the charging area or mat requires significantly less attention of a driver/user than removing the receiver device entirely from the mat and replacing it on the charging area or mat.

The detection of a change in condition may be based on a periodic transmission of analog ping and detection of a change in parameter values (e.g., decay rate and oscillation time). Although this may be sufficient to detect events such as removal of a device from charging area or mat or removal of significant foreign object, it is not accurate and consistent enough to detect changes in device alignment or smaller foreign object removal.

As disclose in embodiments herein, a transmitter may initiate after the end of power transfer (e.g., immediately after), a digital ping and wait for a response comprising a signal strength value. The signal strength value may be stored and the digital ping terminated. If no signal strength is received, a value of zero representing no signal may stored. The transmitter may then send periodic digital pings to activate the receiver and await to receive the receiver initial signal strength packet. The value reported in the signal strength packet may be compared to the value collected after power transfer was aborted due to an abnormal condition (e.g., foreign object detection, loss of communication, or other protocol error). If the received signal strength is higher by a particular margin from the stored signal strength, which may indicate an improvement in alignment or removal of a foreign object, the transmitter may attempt to re-engage the receiver and transfer power transfer. The re-engagement process may include multiple digital pings attempts with the receiver.

If the signal strength is not received or is at similar level to the collected value, the digital ping may be terminated, and the transmitter may not re-initiate a digital ping and power transfer, but rather continue to send periodic analog pings, for detection and removal of a foreign object, as well as periodic digital pings to collect signal strength values.

Figure 4A:
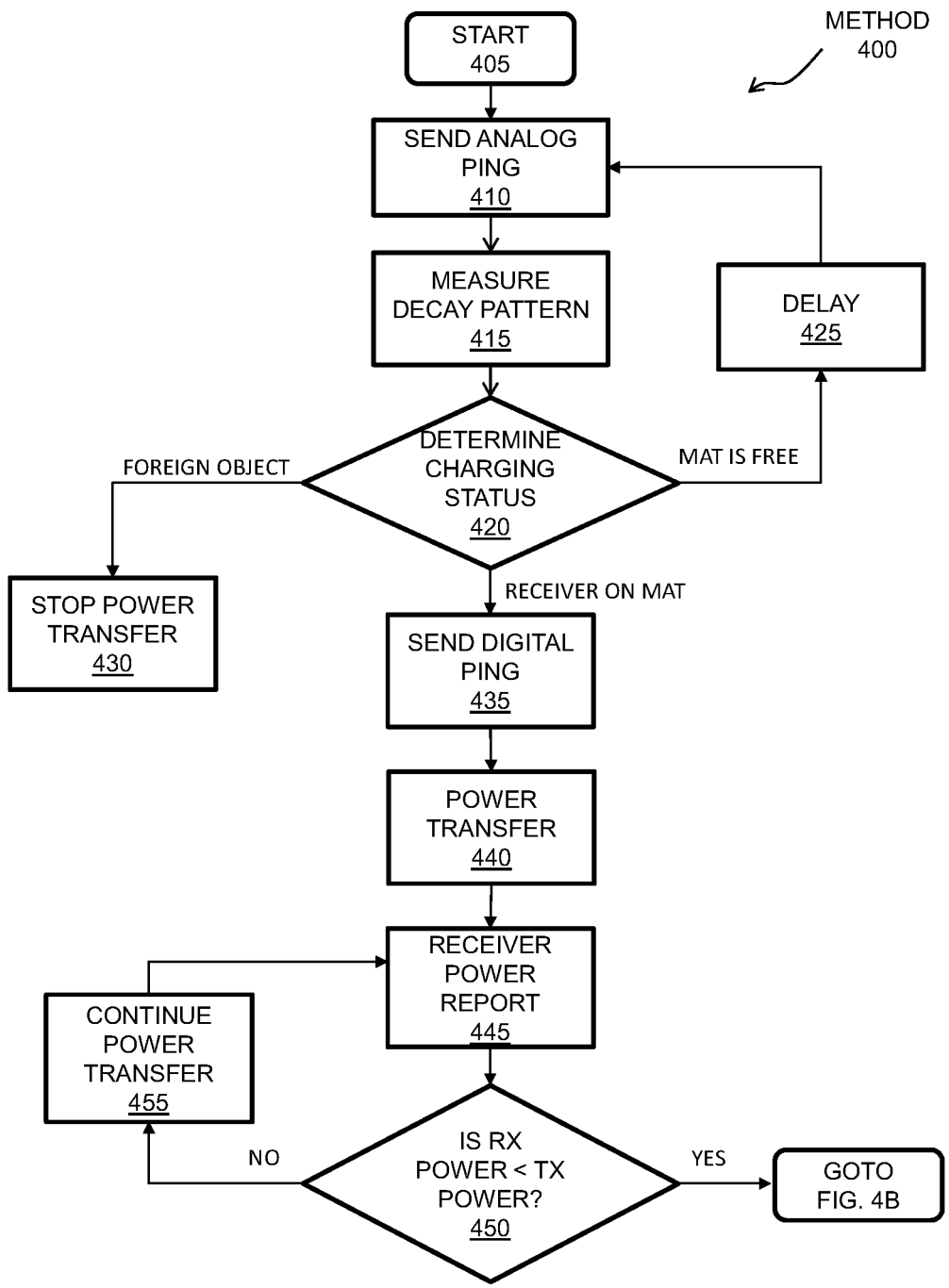
FIG. 4A depicts a method of foreign object detection in accordance with one or more embodiments.
Figure 4B:
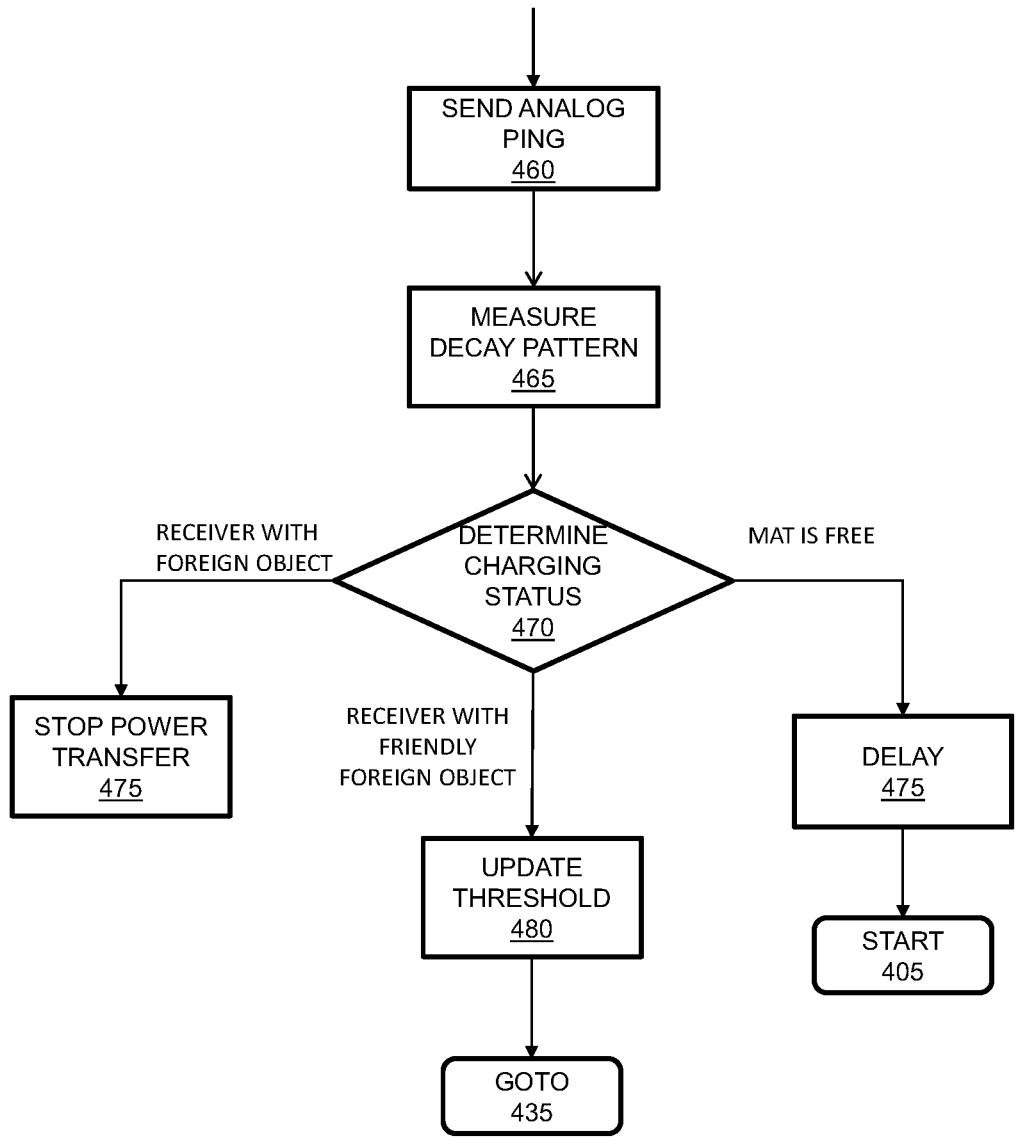
FIG. 4B depicts a method of foreign object detection in accordance with one or more embodiments.

FIGS. 4A and 4B show a method 400 of foreign object detection. A transmitter may send a first analog ping (410). The transmitter may measure a decay pattern of the first analog ping (415). The transmitter may measure a decay rate and an oscillation time of the decay pattern.

The transmitter may determine a charging status (420). The determination may be based on the first analog ping session rules described herein. The transmitter may determine that the charging area or mat is clear and no device or receiver is on the charging area. On a condition that the transmitter determines that the charging area is clear (mat is free), the transmitter may wait for a period of time (delay) (425) and then send another analog ping (410).

The transmitter may determine that a foreign object is detected. The determination may be based on the first analog ping session rules described herein. On a condition that the transmitter determines that a foreign object is detected, the transmitter may stop power transfer (end charging) (e.g., enter a no charge state) (430). In another embodiment, the transmitter may enter a sliding state.

The transmitter may determine that a device or receiver is on the charging area (receiver is on the mat). The determination may be based on the first analog ping session rules described herein. On a condition that the transmitter determines that a receiver is on the charging area, the transmitter may send a digital ping (435). The transmitter may transfer power to the receiver (440). The transmitter may receive a power report from the receiver (445). The power report may include a received power value. The transmitter may determine whether the receiver power value is less than a determined transmitter power over a threshold value (TH) (450). The transmitter power may take into account transmitter power losses (e.g., RxPower<TxPower−TxLosses−TH). The threshold value (TH) may be determined to allow safety margins to prevent heating of objects and to minimize false triggering due to measurement and estimation errors. In an embodiment, a value for TH may be in the 100 mW range.

If the transmitter determines that the received power value is greater than or equal to the determined transmitted power value, the transmitter continues to transfer power (455) and waits to receive another power report from the receiver (445).

If the transmitter determines that the received power value is less than the determined transmitter power value, the transmitter may send a second analog ping (460). The transmitter may measure a decay pattern of the second analog ping (465). The transmitter may measure a decay rate and an oscillation time of the decay pattern.

The transmitter may determine a charging status (470). The determination may be based on the second analog ping session rules described herein. The transmitter may determine that the charging area or mat is clear and no device or receiver is on the charging area (mat is free). On a condition that the transmitter determines that the charging area is clear, the transmitter may wait for a period of time (delay) (475) and then start the process again (405).

The transmitter may determine that a receiver with a foreign object is detected. The determination may be based on the second analog ping session rules described herein. On a condition that the transmitter determines that a receiver with a foreign object is detected, the transmitter may stop power transfer (end charging) (e.g., enter a no charge state) (475). In another embodiment, the transmitter may enter a sliding state.

The transmitter may determine that a receiver with a friendly foreign object is detected. The determination may be based on the second analog ping session rules described herein. On a condition that the transmitter determines that a receiver with a friendly foreign object is detected, the transmitter may update the threshold (480), and send another digital ping (435).

The flowchart and block diagrams in the drawings illustrate the architecture, functionality, and operation of possible implementations of apparatuses, systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the flowchart and block diagrams in the drawings. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used herein, specify the presence of stated features, integers, steps, operations, elements, and/or components, but do not preclude the presence or addition of one more other features, integers, steps, operations, element components, and/or groups thereof.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for detecting a foreign object implemented by a wireless power transmitter, the method comprising:
   sending a digital ping to a receiver;
   transferring power to the receiver;
   receiving a report from the receiver, wherein the report comprises a received power value;
   determining a transmitted power parameter value, wherein the transmitted power parameter value is a threshold value and transmitter losses subtracted from a transmitter power;
   determining that the received power value is less than the determined transmitted power parameter value;
   sending an analog ping to the receiver in response to the determining that the received power value is less than the determined transmitted power parameter value;
   measuring a decay pattern of the analog ping;
   determining that the receiver comprises a friendly foreign object; and
   updating the threshold value.

2. The method of claim 1, wherein the measuring a decay pattern of the analog ping comprises:
   measuring a decay rate value of the analog ping; and
   measuring an oscillation time value of the analog ping.

3. The method of claim 1, further comprising:
   updating a preconfigured decay rate value; and
   updating a preconfigured oscillation time value.

4. The method of claim 3, wherein the updating the preconfigured decay rate value further comprises:
   determining that a measured decay rate value is less than or equal to the preconfigured decay rate value by a threshold amount; and
   replacing the preconfigured decay rate value with the measured decay rate value.

5. The method of claim 3, wherein the updating the preconfigured oscillation time value further comprises:
   determining that a measured oscillation time value is less than or equal to the preconfigured oscillation time value by a threshold amount; and
   replacing the preconfigured oscillation time value with the measured oscillation time value.

6. The method of claim 1, wherein the determining that the receiver comprises a friendly foreign object comprises:
   determining that a measured oscillation time value is greater than a stored oscillation time value; and
   determining that a measured decay rate value is less than or equal to a decay rate threshold.

7. The method of claim 1, further comprising after updating the threshold value:
   sending a second digital ping to the receiver;
   transferring power to the receiver;
   receiving a second report from the receiver, wherein the second report comprises a received power value;
   determining a second transmitted power parameter value, wherein the second transmitted power parameter value is based on the updated threshold value subtracted from a transmitter power;
   determining that the received power value is less than the determined second transmitted power parameter value;
   sending a second analog ping to the receiver in response to the determining that the received power value is less than the determined second transmitted power parameter value;
   measuring a decay pattern of the second analog ping;
   determining that the receiver comprised a friendly foreign object; and
   updating the updated threshold value.

8. The method of claim 1, further comprising:
   determining that there is a receiver in a charging area before sending the digital ping.

9. The method of claim 8, wherein determining that there is a receiver in a charging area is based on a measured decay rate value and a measured oscillation time value.

10. A wireless power transmitter comprising circuitry configured to:
send a digital ping to a receiver;
transfer power to the receiver;
receive a report from the receiver, wherein the report comprises a received power value;
determine a transmitted power parameter value, wherein the transmitted power parameter value is a threshold value and transmitter losses subtracted from a transmitter power;
determine that the received power value is less than the determined transmitted power parameter value;
send an analog ping to the receiver in response to the determining that the received power value is less than the determined transmitted power parameter value;
measure a decay pattern of the analog ping;
determine that the receiver comprises a friendly foreign object; and
update the threshold value.

11. The wireless power transmitter of claim 10, wherein the wireless power transmitter circuity is further configured to:
measure a decay rate value of the analog ping; and
measure an oscillation time value of the analog ping.

12. The wireless power transmitter of claim 10, herein the wireless power transmitter circuity is further configured to:
update a preconfigured decay rate value; and
update a preconfigured oscillation time value.

13. The wireless power transmitter of claim 12, wherein the wireless power transmitter circuity is further configured to:
determine that a measured decay rate value is less than or equal to the preconfigured decay rate value by a threshold amount; and
replace the preconfigured decay rate value with the measured decay rate value.

14. The wireless power transmitter of claim 12, wherein the wireless power transmitter circuitry is further configured to:
determine that a measured oscillation time value is less than or equal to the preconfigured oscillation time value by a threshold amount; and
replace the preconfigured oscillation time value with the measured oscillation time value.

15. The wireless power transmitter of claim 10, wherein the wireless power transmitter circuitry is further configured to determine that the receiver comprises a friendly foreign object by:
determining that a measured oscillation time value is greater than a stored oscillation time value; and
determining that a measured decay rate value is less than or equal to a decay rate threshold.

16. The wireless power transmitter of claim 10, wherein the wireless power transmitter circuitry is further configured to, after the threshold value is updated:
send a second digital ping to the receiver;
transfer power to the receiver;
receive a second report from the receiver, wherein the second report comprises a received power value;
determine a second transmitted power parameter value, wherein the second transmitted power parameter value is based on the updated threshold value subtracted from a transmitter power;
determine that the received power value is less than the determined second transmitted power parameter value;
send a second analog ping to the receiver in response to the determining that the received power value is less than the determined second transmitted power parameter value;
measure a decay pattern of the second analog ping;
determine that the receiver comprised a friendly foreign object; and
update the updated threshold value.

17. The wireless power transmitter of claim 10, wherein the wireless power transmitter circuitry is further configured to:
determine that there is a receiver in a charging area before sending the digital ping.

18. The wireless power transmitter of claim 17, wherein the wireless power transmitter circuitry is further configured to determine that there is a receiver in a charging area is based on a measured decay rate value and a measured oscillation time value.

* * * * *